Sept. 19, 1961  A. M. JONGENEEL  3,000,450
PLANT THINNING MACHINE
Filed Oct. 9, 1959  3 Sheets-Sheet 1
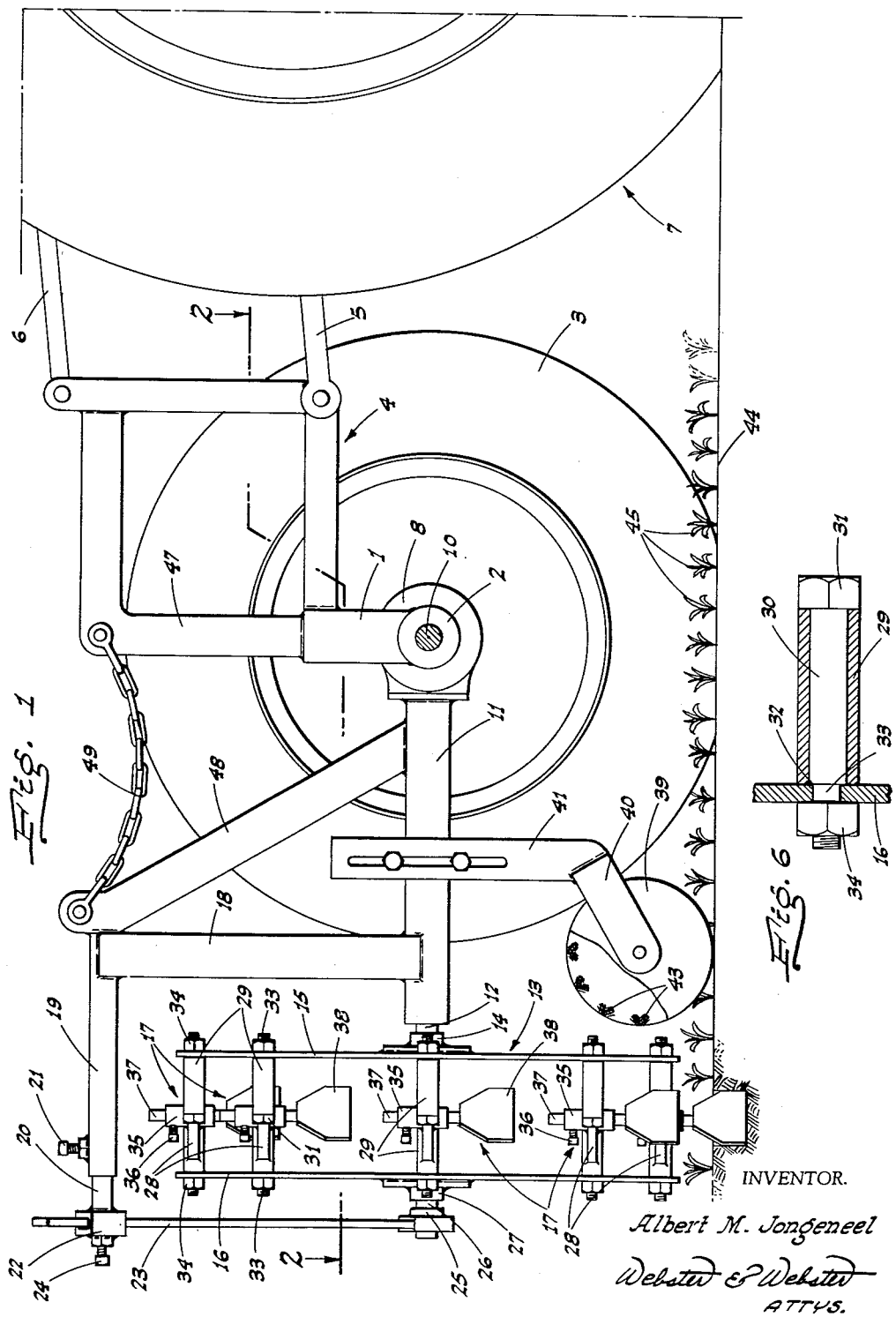
INVENTOR.
Albert M. Jongeneel
Webster & Webster
ATTYS.

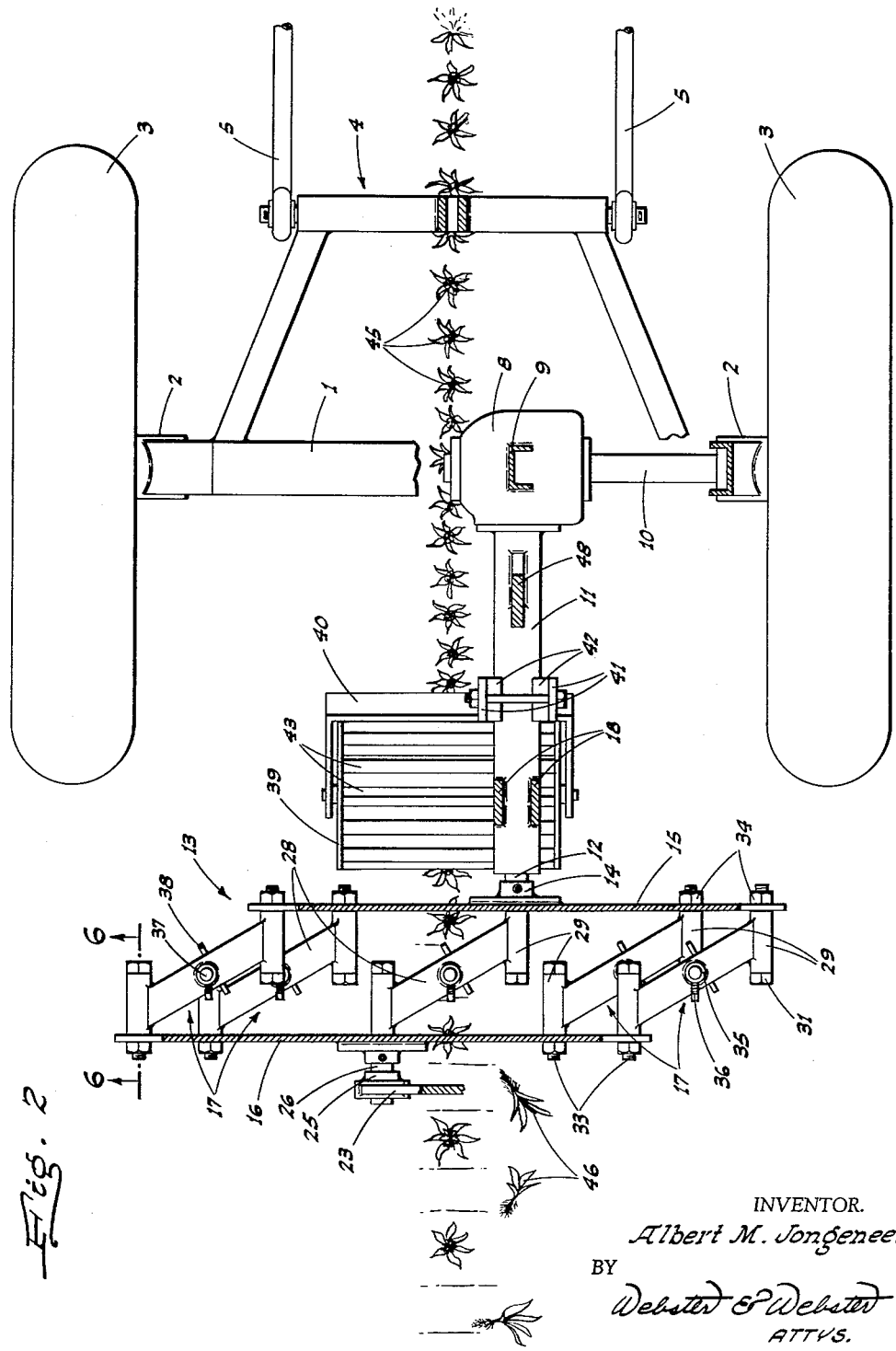

Sept. 19, 1961     A. M. JONGENEEL     3,000,450
PLANT THINNING MACHINE
Filed Oct. 9, 1959     3 Sheets-Sheet 3
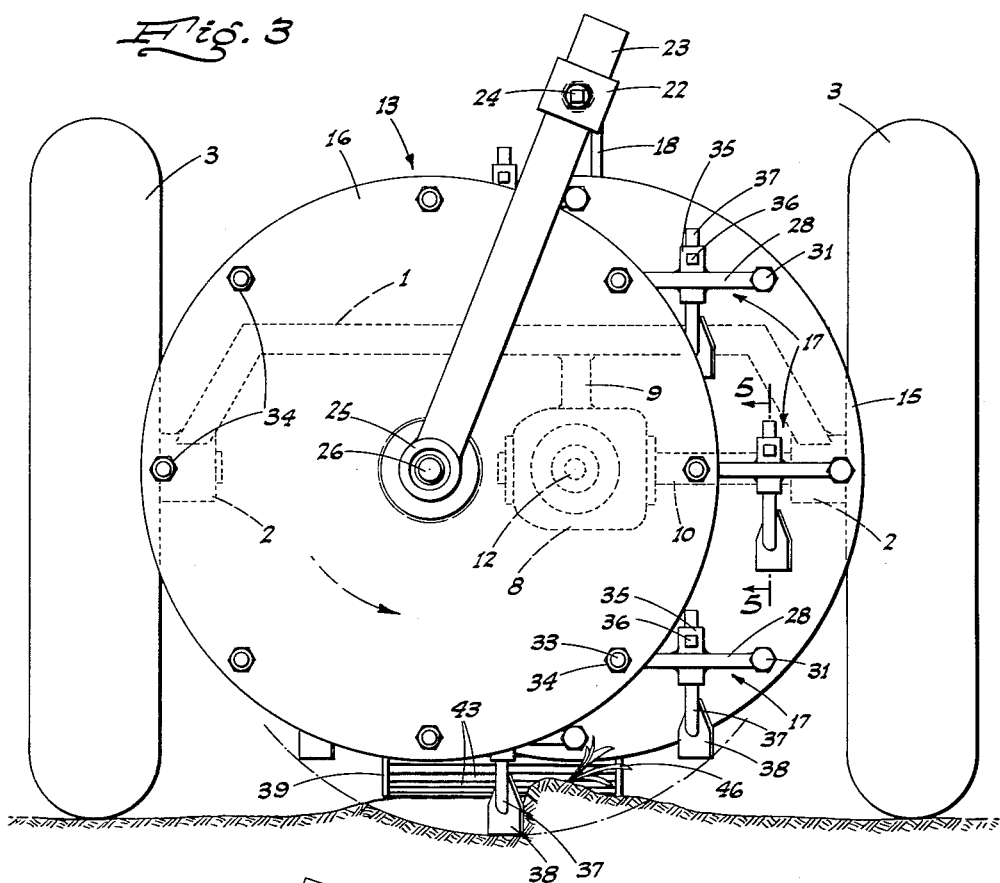
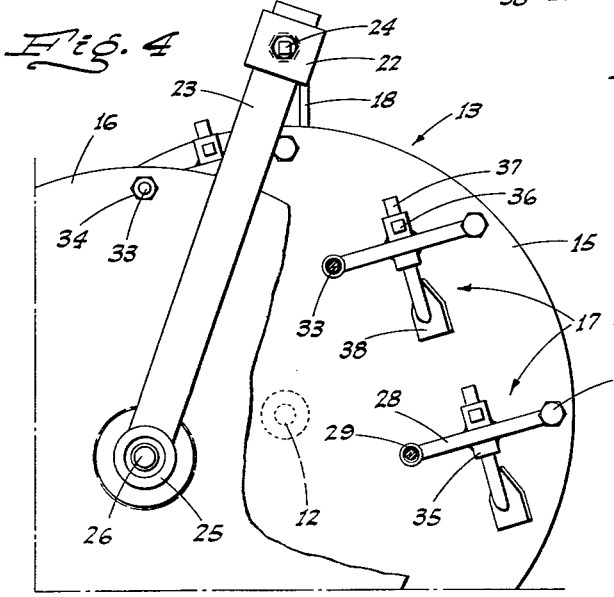
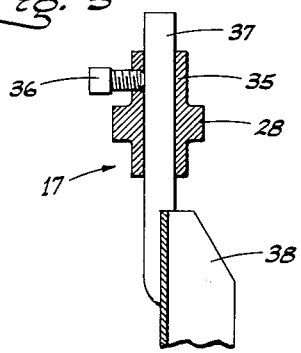
INVENTOR.
Albert M. Jongeneel
BY
Webster & Webster
ATTYS.

3,000,450
PLANT THINNING MACHINE
Albert M. Jongeneel, 165 Edgewater Drive,
Rio Vista, Calif.
Filed Oct. 9, 1959, Ser. No. 845,554
1 Claim. (Cl. 172—94)

This invention relates in general to agricultural equipment, and in particular is directed to a machine for thinning row crops, such as sugar beets.

It is a major object of the present invention to provide a machine which embodies a novel, rotary plant thinning device operative to chop or block out excess, young growth plants in a crop row; i.e. to recurringly, and in timed relation to the speed of advance of the machine, remove from the crop row certain of the plants while leaving others to grow to maturity in adequately and equally spaced relation.

Another important object of the invention is to provide a machine, as above, wherein said device includes a plurality of plant thinning blade units pivotally mounted on a rotary structure in circumferentially spaced array and for travel in a circular path in a transverse vertical plane; the arrangement being such that said thinning blade units automatically remain at all times parallel to each other and in a predetermined position relative to vertical whereby such blade units—which in their lowermost position extend below the rotary structure—successively sweep through the crop row with a like action.

An additional object of the invention is to provide a device, as in the preceding paragraph, wherein the thinning blade units are adjustable with respect to the depth of cut of the blades and the working angle thereof both in the direction of rotation and transversely thereof.

A further object of the invention is to provide a novel gauge roller, in association with said device, adapted to adjustably preset the latter so that the rotary structure of the device runs adjacent but above the crop row while the thinning blade units successively sweep through such row as hereinbefore described.

It is also an object of the invention to provide a plant thinning machine which is of relatively simple structure, and designed for ease and economy of manufacture; the machine being capable of long use with a minimum of repair or maintenance being required.

A still further object of the invention is to provide a practical, reliable, and durable plant thinning machine, and one which is exceedingly effective for the purpose for which it is designed.

These objects are accomplished by means of such structure and relative arrangement of parts as will fully appear by a perusal of the following specification and claim.

In the drawings:

FIG. 1 is a side elevation of the machine as tractor-mounted and in use.

FIG. 2 is a sectional plan view taken on line 2—2 of FIG. 1.

FIG. 3 is a rear end elevation of the machine as in use.

FIG. 4 is a fragmentary rear end elevation, partly broken away, showing the rear disc as adjusted to alter the working angle of the thinning blade units in the direction of rotation.

FIG. 5 is an enlarged, fragmentary, transverse sectional elevation, on line 5—5 of FIG. 3, of one of the thinning blade units.

FIG. 6 is an enlarged, fragmentary, longitudinal sectional elevation, on line 6—6 of FIG. 2, showing in detail one of the bearing assemblies employed at the ends of each thinning blade unit.

Referring now more particularly to the drawings and to the characters of reference marked thereon, the plant thinning machine comprises an arched cross beam 1 fitted at the ends with hubs 2 on which transversely spaced wheels 3 are journaled. A draft frame, indicated generally at 4, is fixed in connection with and projects forwardly from the cross beam 1; such draft frame being adapted—at its forward end—for connection in draft and lift relation with the transversely spaced lower draft and lift links 5, and the upper draft link 6 of a tractor indicated generally at 7, but shown only in part.

A gear box 8 is rigidly supported beneath the cross beam 1, intermediate the ends of the latter, by a suspension bracket 9; such gear box 8 being driven from one of the wheels 3 by means of an axle 10.

A tubular housing 11 is fixed in connection with and projects rearwardly from the gear box 8, and such housing 11 encloses a shaft 12 which projects a short distance out of the rear end of said housing. At the exposed rear end thereof, the shaft 12 is connected to a rotary, plant thinning device indicated generally at 13, and which device comprises the following:

A hub 14 fixed on the exposed rear end of the shaft 12 is secured centrally to a transversely disposed front disc 15 of substantial diameter. A transversely disposed rear disc 16 occupies a position in adjacent but spaced facing relation to the front disc 15 but with the axis of said rear disc 16 laterally offset with respect to the axis of shaft 12. The discs 15 and 16 are of like diameter and are connected together by a plurality of circumferentially spaced thinning blade units indicated generally at 17, and which are hereinafter described in detail.

The rear disc 16 is supported from the housing 11, without obstructing the thinning blade units 17, in the following manner:

A rigid post 18 upstands from the housing 11 adjacent its rear end, and such post terminates at its upper end in a plane above the assembly of the discs 15 and 16. A longitudinal, rearwardly projecting sleeve or tubular arm 19 is fixed on the upper end of the post 18, and such arm 19 has a shaft 20 telescoped therein from the rear end; the shaft 20 normally being maintained in a fixed position by a set screw 21 on said arm 19.

The rear end of the shaft 20 is formed with a slotted head 22 through which a radial stay bar 23 extends in normally fixed but adjustable relation; the slotted head 22 including a set screw 24 for securing the stay bar 23 in said head.

The stay bar 23 extends downwardly from the slotted head 22, and at its lower end such stay bar is formed with an outboard bearing 25 which carries a stub shaft 26 projecting from a central hub 27 on the rear disc 16.

Mounted as described, the front disc 15 is rotatable with shaft 12 as an axis while the rear disc 16 is rotatable with the stub shaft 26 as an axis; such axes being laterally offset by reason of the corresponding offsetting of the discs.

Each of the thinning blade units 17 comprises a transversely diagonal bar 28 formed at each end with an integral bearing sleeve 29; the bearing sleeves 29 being parallel to each other and to the axes of rotation of the discs 15 and 16.

Each bearing sleeve 29 is pivotally connected to the related disc 15 or 16 by means of a bolt 30 headed at its free end, as at 31, and shouldered, as at 32, for abutment against the adjacent disc whereby the corresponding bearing sleeve 29 is turnable without binding on said bolt.

Beyond the shoulder 32, the reduced diameter shank 33 of the bolt passes through the disc and carries a threaded-on nut 34. Each transversely diagonal bar 28 is formed centrally of its ends with a tubular boss 35 fitted with a set screw 36; a shank 37 extending through and depending from said boss. The shank is longitudinally and rotatably adjustably secured in the boss 35 by the set screw 36. On the depending or lower end portion of the shank 37, it is fitted with a forwardly facing, thinning blade 38.

The shanks 37 of the thinning blade units 17 are set so that the blades 38, when in their lowermost position, are disposed to work a distance below the assembly of the discs 15 and 16. Additionally, the blades 38 may, by appropriate rotary adjustment of the shanks 37, be set to a selected working angle transversely of the direction of rotation.

As mounted between the front disc 15 and rear disc 16, all of the transversely diagonal bars 28 are parallel to each other, and the spacing between the axes of the bearing sleeves 29 of each thinning blade unit 17 is equal to the lateral offset between the axes of said discs 15 and 16.

A transverse axis gauge roller 39 is disposed centrally between the wheels 3 and adjacent but ahead of the front disc 15; such roller being carried in a fork 40 which includes a slotted standard 41 vertically adjustably secured to the tubular housing 11 by a clamp 42. The roller 39 is comprised—on its working face—of a plurality of circumferentially spaced cross bars 43 whereby said roller is slotted to prevent any substantial crushing of the plants in the crop row along which such roller travels during operation of the machine as hereinafter described.

In operation of the plant thinning machine, and with the same connected in draft relation to the tractor 7, the wheels 3 run in equally spaced relation on opposite sides of a crop row 4 and which crop row includes closely disposed young plants 45 which are to be thinned. The roller 39 is adjusted so that as such roller advances on the crop row 44, the lowermost portion of the assembly of the discs 15 and 16 runs adjacent but in clearance relation to said crop row.

As the machine advances, the front disc 15 is ground driven or rotated at a proportionate speed through the medium of shaft 12, gear box 8 and axle 10; the rotation of the front disc 15 being transmitted to the rear disc 16 by means of the thinning blade units 17.

With such simultaneous rotation of the front disc 15 and rear disc 16, the thinning blade units 17—by reason of their structural form and what may be termed the resultant crank action thereof—all remain parallel to each other and with the shanks 37 all depending in like position at all times. Consequently, as each thinning blade unit 17 reaches its lowermost position, the blade 38—which then is disposed a distance below the discs—sweeps transversely through the crop row 44 and chops or blocks out one of the plants in such row; the blocked-out plants being indicated at 46. Hence, with advance of the machine, the thinning blade units 17 are operative to recurringly, and in timed relation, remove from the crop row intermediate plants while leaving the others properly and equally spaced for growth to maturity.

When it is desired to change the angle of attack or the working angle of the thinning blade units 17 in the direction of rotation, as for example between the position shown in FIG. 3 and the position shown in FIG. 4, the rear disc 16 is adjusted either upwardly or downwardly. This is accomplished by loosening the set screws 21 and 24, accompanied by sliding of the radial stay bar 23 through the slotted head 22, and which causes some part rotation of the shaft 20. After the rear disc 16 is so adjusted, the set screws 21 and 24 are re-tightened.

Also, the angle of each blade 38 relative to the longitudinal plane of the machine may be altered by loosening the related set screw 36 and rotating the blade shank 37 the desired amount.

The rotary, plant thinning device 13 is lifted clear of the ground for transport or for turning at the end of a crop row, by means of the following included structure:

The draft frame 4 includes—at the rear—a central post 47 while a rearwardly and upwardly inclined brace 48 extends from the housing 11 to the top of the post 18; there being a normally slack chain 49 connected between the upper end of the post 47 and the upper end of the brace 48. With upward movement of the links 5 and 6 on the tractor and by means of the usual mechanism, the draft frame 4 is correspondingly raised which lifts the wheels 3 off the ground. When this occurs, the chain 49 becomes taut and the rotary, plant thinning device 13 is likewise lifted to an above-ground position.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

In a plant thinning machine which comprises a mount adapted to be supported above and moved along a crop row, a front driven rotary member journaled on the mount for rotation about an axis lengthwise of the machine, a rear rotary member disposed in adjacent but spaced facing relation to said front rotary member and disposed with its axis in laterally offset relation and parallel to the axis of the front rotary member, a plurality of thinning blade units between and journaled in connection with said rotary members in circumferentially spaced array, and means supporting the rear rotary member from the mount for rotation; said means comprising an axial stub shaft projecting from the rear face of said rear rotary member, a stay bar in which the shaft is supported projecting upwardly therefrom, rigid supporting means connecting the bar and mount including a rigid arm extending over the rotary members in clearance relation thereto, and means adjustably connecting the stay bar and arm, said last named means comprising a shaft turnably projecting into the arm at its rear end and normally clamped against rotation, a slotted head on the rear end of the shaft through which the stay bar slidably projects, and a clamping screw mounted on the head and holding the stay bar against sliding movement.

References Cited in the file of this patent

UNITED STATES PATENTS

| 700,109 | Wilkinson | May 13, 1902 |
| 1,208,514 | Devendorf | Dec. 12, 1916 |
| 2,081,086 | Derho | May 18, 1937 |

FOREIGN PATENTS

| 1,866 | Great Britain | June 15, 1916 |
| 790,596 | Great Britain | Feb. 12, 1958 |
| 56,410 | Sweden | Apr. 1, 1924 |